(12) United States Patent
Clochard (10) Patent No.: US 8,544,927 B2
(45) Date of Patent: Oct. 1, 2013

(54) VEHICLE EQUIPMENT FOR A MOBILE APPLIANCE

(75) Inventor: Pascal Clochard, Chevreuse (FR)

(73) Assignee: Continental Automotive France, Toulouse (FR)

( * ) Notice: Subject to any disclaimer, the term of this patent is extended or adjusted under 35 U.S.C. 154(b) by 166 days.

(21) Appl. No.: 13/318,514

(22) PCT Filed: May 4, 2010

(86) PCT No.: PCT/EP2010/002693
§ 371 (c)(1),
(2), (4) Date: Nov. 2, 2011

(87) PCT Pub. No.: WO2010/127821
PCT Pub. Date: Nov. 11, 2010

(65) Prior Publication Data
US 2012/0048902 A1 Mar. 1, 2012

(30) Foreign Application Priority Data
May 7, 2009 (FR) ...................................... 09 02193

(51) Int. Cl.
*B60R 7/06* (2006.01)
(52) U.S. Cl.
USPC .......................... 296/37.12; 224/483; 224/929
(58) Field of Classification Search
USPC ........ 224/400, 483, 539, 544, 929; 248/27.1; 296/37.12, 24.34
See application file for complete search history.

(56) References Cited

U.S. PATENT DOCUMENTS 5,463,688 A 10/1995 Wijas
5,588,055 A 12/1996 Williamson
(Continued)

FOREIGN PATENT DOCUMENTS

DE 297 05 230 8/1997
EP 1 132 258 9/2001
(Continued)

OTHER PUBLICATIONS

International Search Report dated Jun. 30, 2010, corresponding to PCT/EP2010/002693.

*Primary Examiner* — Justin Larson
(74) *Attorney, Agent, or Firm* — Young & Thompson (57) ABSTRACT

Assembly including a vehicle equipment designed to detachably hold an electrically powered electronic appliance (3) provided with a display screen (5) and manually activatable function keys (7), is characterized in that the equipment has a cavity (11) in which the appliance (3) is held and which for that purpose is open at the front where the cavity (11) is bordered by a part (13a) made of soft material connected to a plate (15) mounted so that it can rotate about an axis (15a) that is transverse to the back of the cavity (11), the appliance (3) being pressed up behind and/or against this part made of soft material (13a) under the effect of first and second thrusting elements.

13 Claims, 6 Drawing Sheets

(56) References Cited

U.S. PATENT DOCUMENTS

| | | | |
|---|---|---|---|
| 6,529,381 B1* | 3/2003 | Schoenfish | 361/725 |
| 7,097,082 B2* | 8/2006 | Wallaker | 224/483 |
| 7,404,298 B2* | 7/2008 | Kim et al. | 62/126 |
| 7,469,951 B2* | 12/2008 | Welschholz et al. | 296/37.8 |
| 7,650,230 B1* | 1/2010 | Laverick et al. | 701/491 |
| 7,900,988 B2* | 3/2011 | Ryu | 296/37.12 |
| 8,172,293 B2* | 5/2012 | Lota et al. | 296/24.34 |
| 8,233,269 B2* | 7/2012 | Hotary et al. | 361/679.01 |
| 8,322,769 B2* | 12/2012 | Kuhlmann | 296/24.34 |
| 2005/0087654 A1* | 4/2005 | Fowler et al. | 248/27.1 |
| 2006/0284024 A1* | 12/2006 | Call et al. | 248/27.1 |
| 2010/0124005 A1* | 5/2010 | Hotary et al. | 361/679.01 |
| 2011/0156418 A1* | 6/2011 | Thorsell et al. | 296/24.34 |

FOREIGN PATENT DOCUMENTS

| | | |
|---|---|---|
| FR | 2 859 424 | 3/2005 |
| FR | 2938481 A1 * | 5/2010 |
| JP | 2002283926 A * | 10/2002 |
| JP | 2009166836 A * | 7/2009 |
| WO | 93/07418 | 4/1993 |
| WO | 2009/112532 | 9/2009 |

* cited by examiner

VEHICLE EQUIPMENT FOR A MOBILE APPLIANCE

FIELD OF THE INVENTION

The present invention relates to the field of motor vehicle interior equipment.

BACKGROUND OF THE INVENTION

At the present time, attempts are being made to communicate with and/or use electronic appliances inside vehicles.

Thus, an assembly has already been proposed that comprises a vehicle equipment designed to detachably hold an electrically powered electronic appliance provided with a display screen and manually activatable function keys.

However, the way in which the appliance is mounted/removed and/or, once mounted, is used does not seem to be practical enough or well enough suited to the features of this type of appliance (size, connectivity, fragility, handling, accessibility, in particular).

SUMMARY OF THE INVENTION

Hence, in order to provide an at least partial solution to these problems, while at the same time offering low design/manufacture/installation costs, it is here proposed that the aforementioned equipment has a cavity in which the appliance concerned is held (theoretically with practically no play) and which for that purpose is open at the front where the cavity is bordered by a part made of soft material connected to a plate mounted so that it can rotate about an axis that is transverse to the back of the cavity, the appliance being pressed up behind and/or against this part made of soft material under the effect of first and second thrusting means which for that purpose respectively comprise:
  a rear pusher mounted in the back of the cavity and provided with first return means designed to push the appliance forwards with enough force to allow it to be operated by pressing its keys when these keys face toward the user,
  and lateral pushers mounted on the lateral edge of the cavity, behind the part made of soft material and provided with second return means designed to push the appliance toward the opposite side.

Because portable computer equipment is evolving rapidly, this type of appliance is not excluded.

However, at the date of filing, the appliance held in the equipment is in theory designed to be one of the following: a portable telephone, a personal organizer, a satellite navigation display unit.

Further, bearing in mind the design trends of this type of appliance, provision is made for its display screen and its keys preferably to be accessible and functional on the façade, both when the appliance is active and when it is on standby.

Thus, this type of appliance in a "slider" or "folding" format is non-preferred, not because it cannot be held, but because it would have to be taken out of the cavity in order to be used.

This selectivity is associated with a search for a balance between the cost of the solution and the number of appliances on the market covered, with a view to it being possible for the appliance to be used while it is housed in the cavity.

In this respect, another feature of the invention makes provision for that part of the equipment that is made of soft material to be interchangeable and corresponds to one out of at least two collars, the central opening of one of which is greater than that of the other, to hold two types of electronic appliance of different sizes, the collar concerned being detachably mounted on the plate, which is at least essentially made of a hard(er) material.

The solution put forward above allows the concerned electronic appliance to be held with ease (actions that come naturally) and without risk to itself (soft material that does not scratch), while at the same time offering an area with ease of access, especially if, as is preferred, the equipment belongs to the vehicle instrument panel, in a near-vertical façade region thereof, typically in the central part, which is therefore very readily accessible both to the driver and to the front-seat passenger.

Provision is even preferably made for the equipment to belong to a compartment door mounted in an articulated manner on such a part of the façade of the instrument panel, in such a way that this compartment door, as it pivots, closes and opens a storage binnacle in one wall of which a fixed power outlet of the vehicle will be situated which outlet is connected to the electrical power supply circuit thereof and to which the appliance can be connected, preferably detachably, via one connector of an electric lead comprising another connector connected detachably to the connection port of this appliance.

BRIEF DESCRIPTION OF THE DRAWINGS

Other features and advantages of the present invention will become further apparent from reading the following description, given by way of illustrative and nonlimiting example, and made with reference to the attached drawings in which.

DETAILED DESCRIPTION OF THE INVENTION

Figure 1:
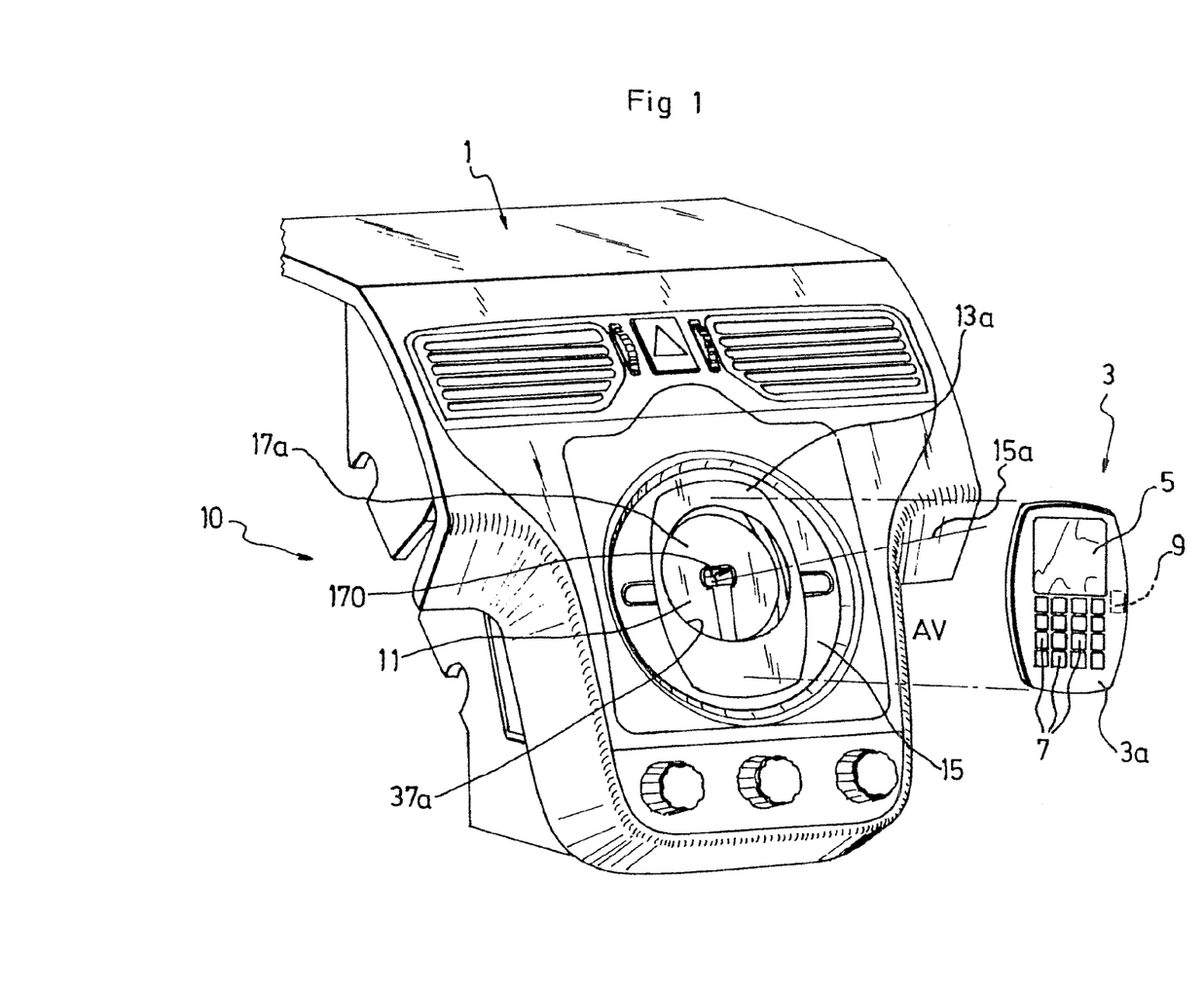
FIGS. 1, 3 illustrate part of an instrument panel provided with the equipment according to the invention, which holds the appliance that has been chosen.
Figure 3:
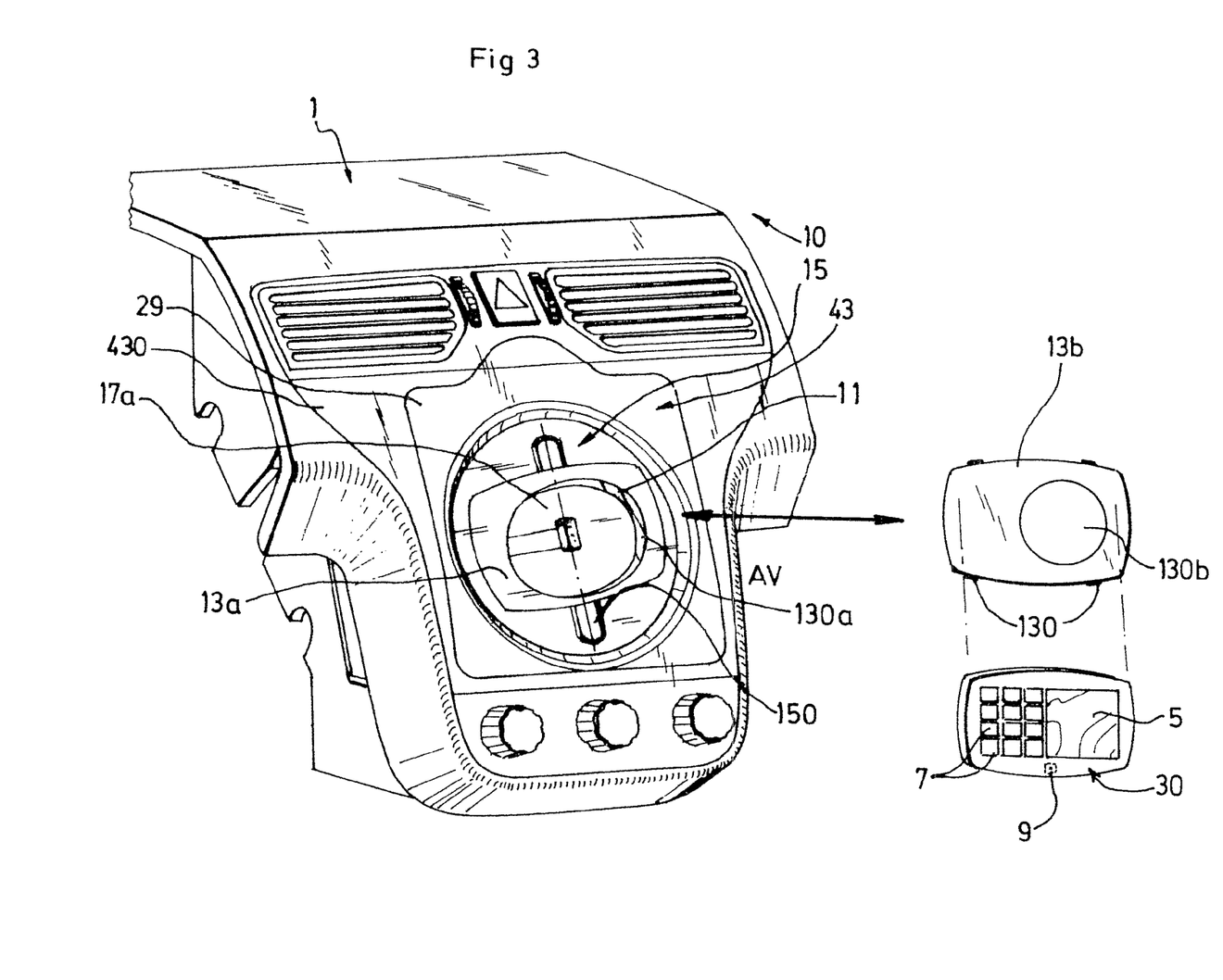
Figure 4:
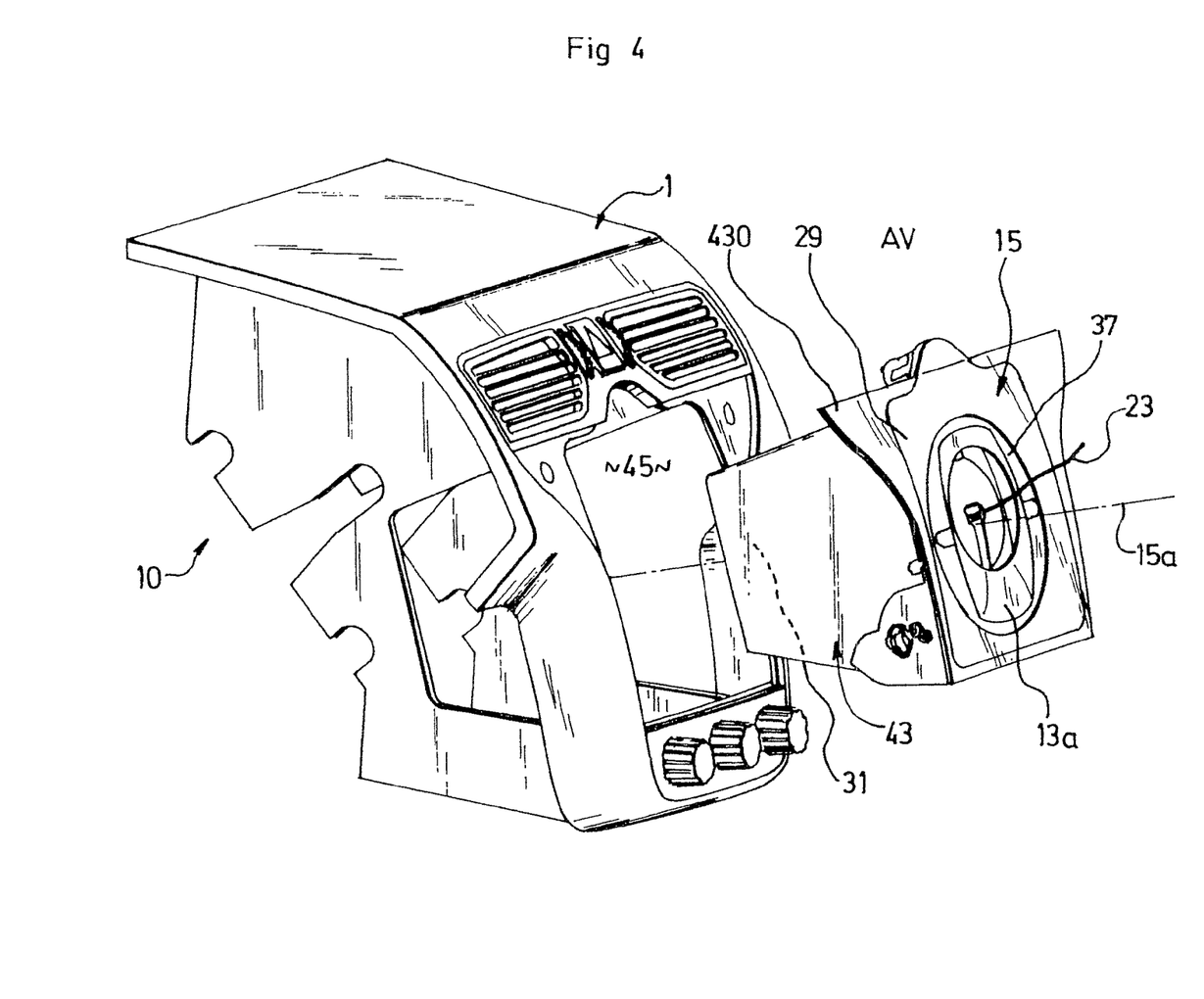
FIG. 4 illustrates the compartment door unit ready to be mounted on the relevant part of the instrument panel.

A central part of the console or façade of the instrument panel 1 of a motor vehicle 10 is schematically depicted in FIGS. 1, 3, 4 in particular.

This is a piece of equipment designed to detachably hold an electronic appliance 3 provided with a display screen 5 and manually activatable function keys 7. It is powered by a rechargeable battery 9.

Particularly in FIGS. 1, 3, it may be seen that this equipment has a cavity 11 in which the appliance 3 is held (practically) without play.

In the embodiment illustrated, the equipment has been optimized to hold, by way of appliance 3: a mobile telephone or a personal organizer or a satellite navigation display unit.

Further, bearing in mind the retaining means adopted again in this preferred embodiment, it is advisable to use such an appliance, the screen 5 and the keys 7 of which are accessible and functional on the façade, both when the appliance is active and when it is on standby, that is to say an appliance of the "conventional" type (therefore which can be opened/closed without sliding or folding).

In particular, in order to hold this type of appliance and allow it to be functional and operable from this point by an occupant seated in one of the front seats of the vehicle, the cavity 11 is open at the front (AV) where it is bordered by a part 13a made of soft material connected to a plate 15 (FIG. 4) mounted so that it can rotate about an axis 15a that is transverse to the back of the cavity. The softness may be of the order of 80 Shore A, the other hard materials having a hardness of twice that or more.

Figure 2:
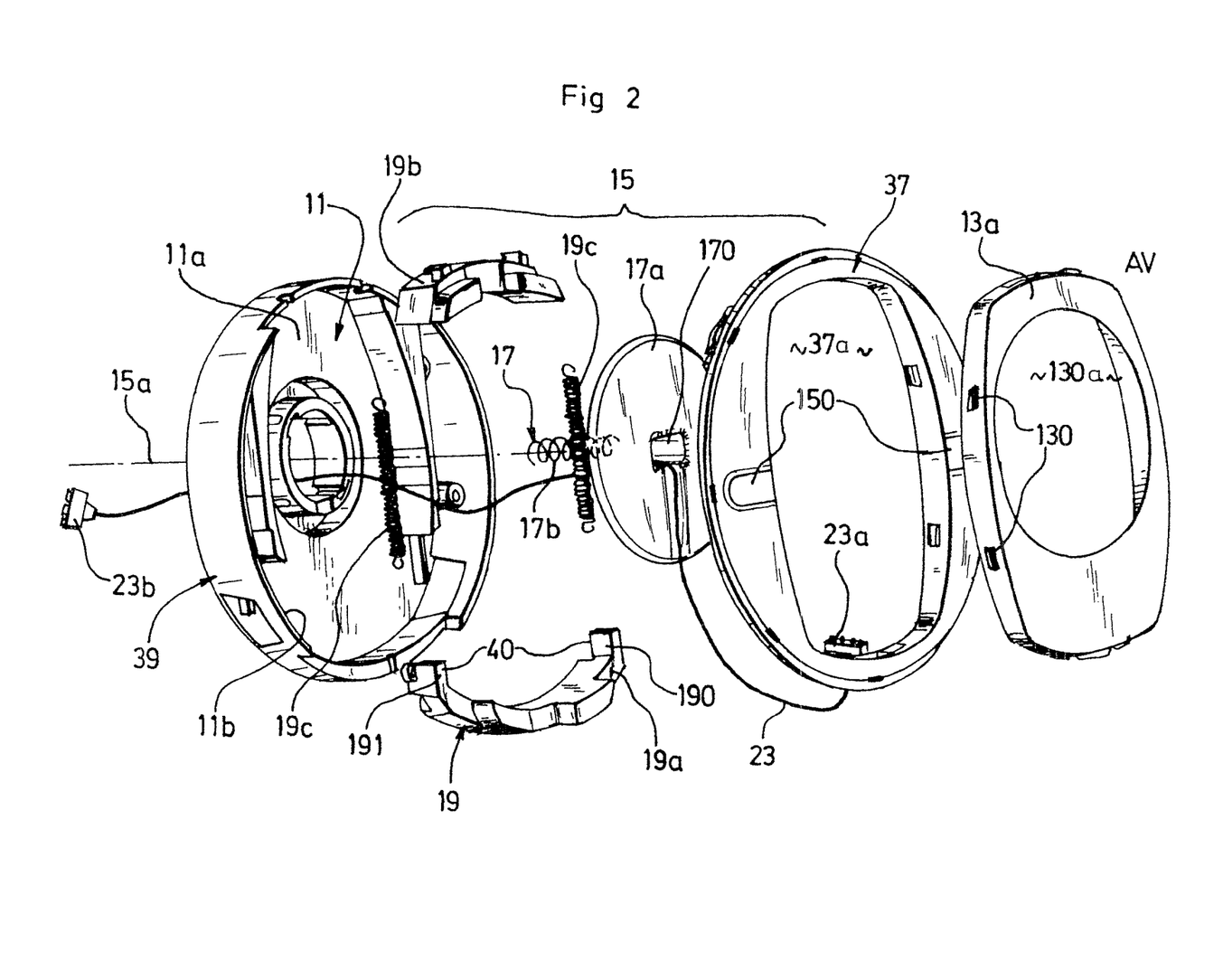
FIG. 2 is an exploded view of part of this equipment.

In FIGS. 1, 3 in particular it may be seen that the dimensions of the appliance and of the equipment (particularly the cavity and soft part 13a) are matched to one another in such a way that, when mounted in the cavity 11, the appliance 3 presses up behind and/or against this soft part 13a under the effect of first and second thrusting means 17, 19 respectively (FIG. 2).

Preferably, the appliance 3 will thus press up behind said soft part, against the rear face of its frontal wall surrounding its central orifice.

As shown, the thrusting means for that respectively comprise a rear pusher 17a mounted in the back 11a of the cavity 11 and lateral pushers 19a, 19b (FIG. 2) mounted on the lateral edge 11b of the cavity to move parallel to it.

First return means 17b are designed to push the rear pusher 17a, and therefore the appliance, forward. Preferably, this force will be strong enough so that when the appliance is mounted in the cavity (FIGS. 1, 3) it can be operated by pressing its keys 7 when these keys face the user (toward the front AV).

As for the lateral pushers 19a, 19b, these are therefore present behind the part 13a made of soft material and in this instance are provided with second return means 19c designed to push them, with the appliance, toward the opposite side.

Two diametrically opposed lateral pushers are advisable (although a single one that pushes the appliance against the opposite lateral edge 11b of the cavity might also be suitable).

The first and second return means may be springs.

Preferably, to encourage optimized fitting and holding of the aforementioned types of appliance that are recommended, while at the same time allowing them to be put to operational use, it is recommended that the part made of soft material 13a be interchangeable and correspond to (at least) one of two collars 13a, 13b (FIGS. 2, 3), the central opening 130a of one of which is greater than that 130b of the other, so as to hold two types of electronic appliance 3, 30 of different sizes.

The collar 13a, 13b adopted is therefore mounted detachably on the plate, which is at least essentially made of hard material (typically a medium-density or high-density plastic).

For optimum use of the appliance, it is further recommended that, when positioned in the cavity 11, it is in a condition that is connected detachably to a first connector 23a of an electric lead 23 comprising a second connector 23b connected detachably to a fixed power outlet 25 (FIG. 5) of the vehicle which outlet is connected to the electrical power supply circuit 27 of this vehicle (via the battery).

Figure 5:
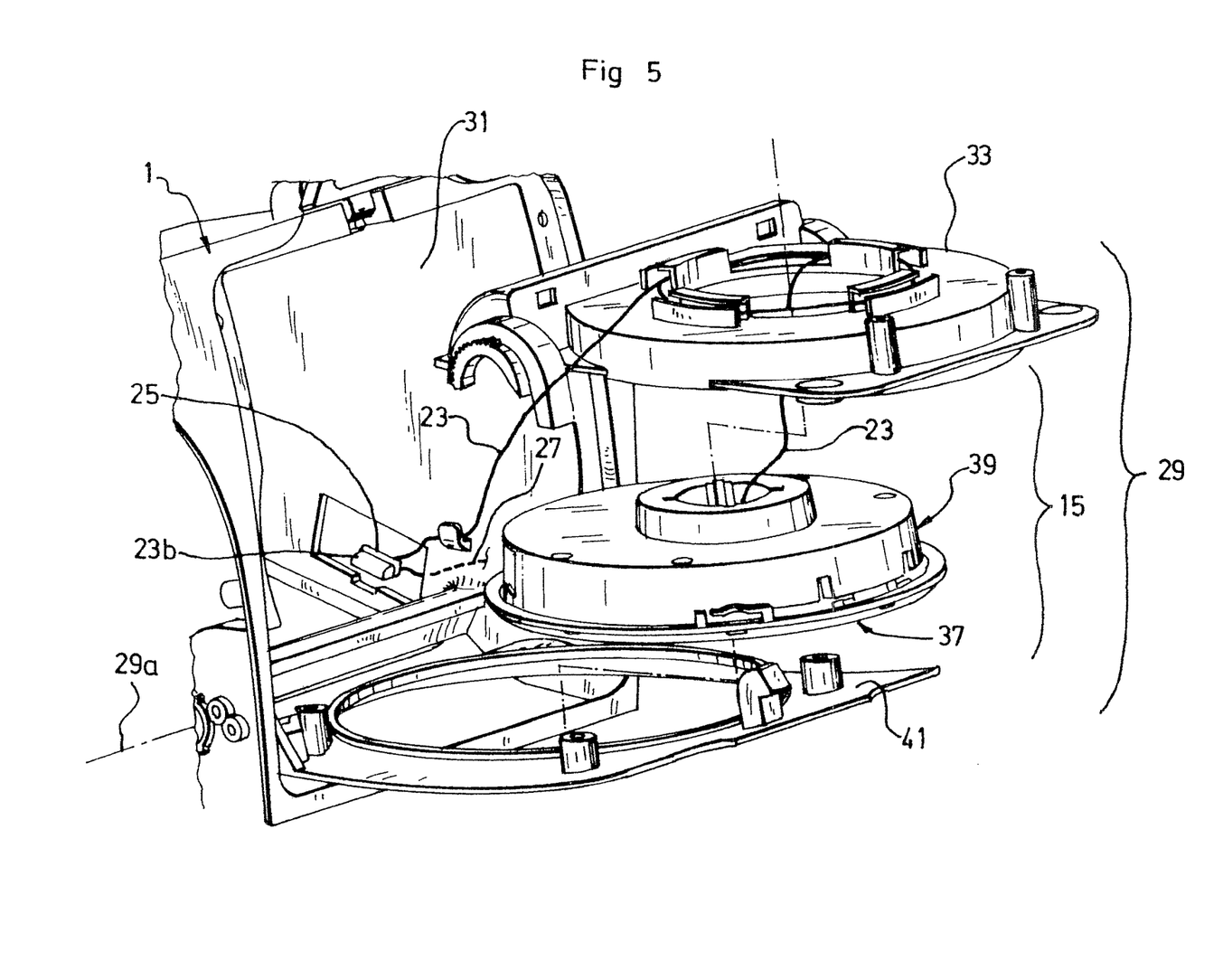
FIGS. 5, 6 illustrate details of this compartment door in the open position, pivoted forward.

From FIG. 5 in particular, it may be seen that the equipment that holds the appliance will preferably belong to a compartment door 29 mounted in an articulated manner on a near-vertical part of the façade of the instrument panel 1.

Figure 6:
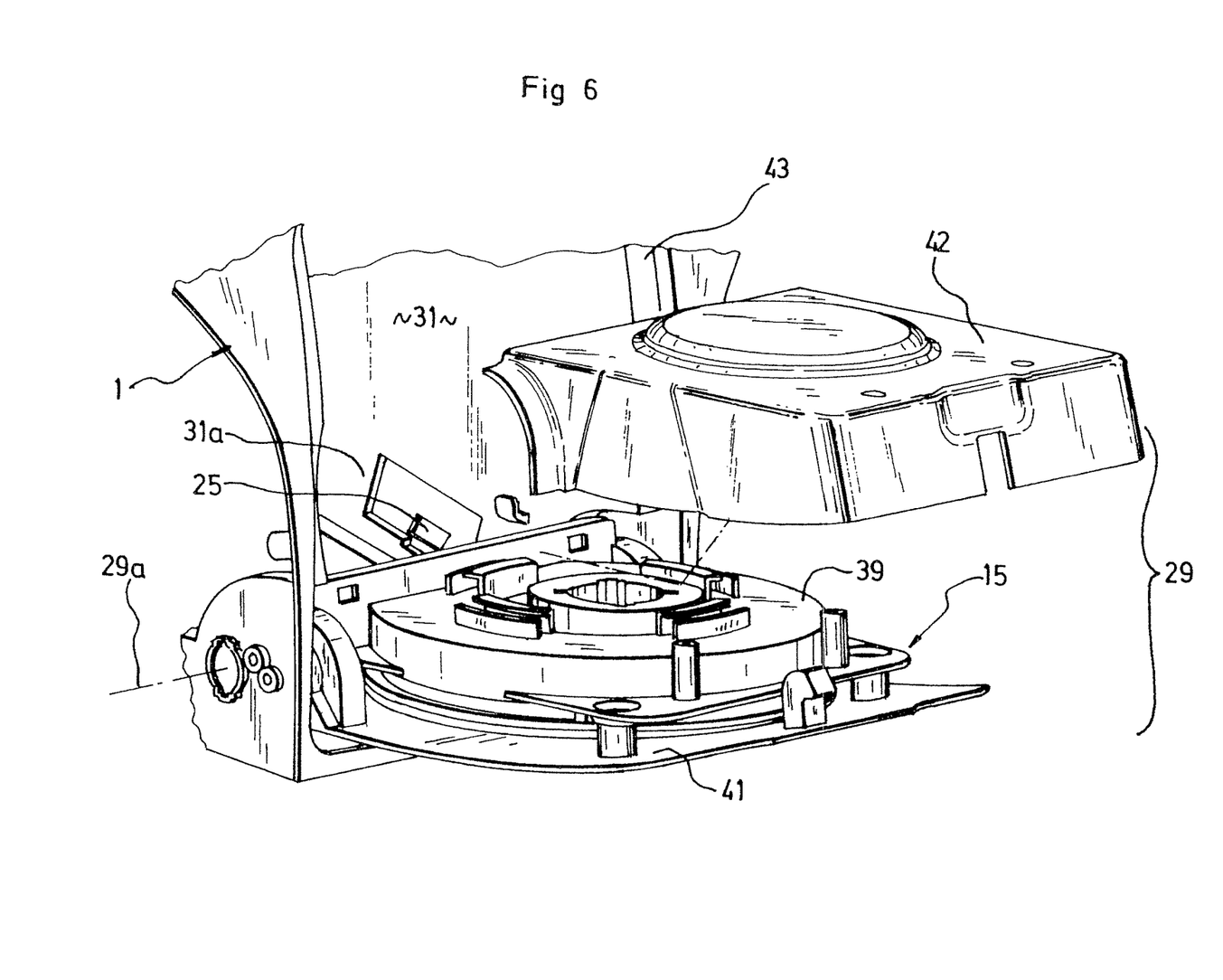

As it pivots about a horizontal axis 29a (FIG. 6), the compartment door 29 closes and opens a storage binnacle 31 in one wall 31a of which the fixed power outlet 25 is situated.

From FIG. 2 in particular, it may also be seen that the electric lead 23 will preferably pass through the rear pusher 17a (orifice 170) along said axis 15a that is transverse to the back 11a of the cavity 11, and is wound at the rear of a cup-shaped part 33 (FIG. 5) situated behind the rotary plate 15.

In a number of the figures it may also be seen that the plate 15 will preferably be provided at the front with protrusions 150 able to cause it to pivot with the part 13a or 13b made of soft material and the appliance 3 mounted therein.

From FIGS. 1-3, 5, 6 in particular, it may further be noted that this plate 15 is, in this preferred embodiment, mounted such that it can rotate with said soft part 13a or 13b, with respect to said cup-shaped part 33 situated behind it and in which it is engaged.

As for the rotary plate, it in this instance comprises, joined together:

a façade ring 37 (FIG. 2) in the central opening 37a of which said chosen soft part 13a or 13b is detachably mounted, and an intermediate cup 39 which bounds the cavity 11 and the back 11a of which consequently holds the rear pusher 17a and the lateral wall 11b of which holds the lateral pusher(s) 19a, 19b.

In order to hold the chosen electronic appliance securely, it is also advisable for at least one of these lateral pushers to be in the form of a jaw with lateral raised edges 190, 191 directed toward the cavity 11 and between which an edge, in this instance the edge 3a, of said appliance is held. Two blocks, one fixed and the other moveable, situated facing one another and one of which is provided with the jaw 40, are shown here. Thus, when mounted in the cavity, the appliance concerned is engaged fairly snugly in this jaw which positions it optimally.

The angle through which the rotary plate can turn will preferably be 90°, or even 2×90°, so that a vertical position (FIG. 1) and a horizontal position (FIG. 3) in which the screen is therefore lying down horizontally are available, the latter position typically being best for "navigation/identification" purposes.

As far as the compartment door 29 that can bear the rotary plate is concerned, it comprises a front panel (FIG. 5) rotating about the horizontal axis 29a and in the central orifice of which the rotary plate 15 is positioned. A rear cover 42 (FIG. 6) protects everything and conceals the rear of the cup 33 that carries the wound lead 23.

The aforementioned various parts of the compartment door may be screwed together.

The detachable connection between the flat façade ring 37, made of hard plastic, and the soft collar 13a or 13b can be made through the agency of snugs 130 (FIG. 2) that form clips.

The assembly comprising the compartment door 29, the rotary plate 15 and the block 43 to which this compartment door is articulated and which has a façade 430 (FIG. 4) surrounding the compartment door on the front face AV of the console 1 will preferably thus be designed to be easy to manufacture and fitted in a space 45 which in this instance is reserved for it in the middle of the console.

The invention claimed is:

1. An assembly comprising a vehicle equipment designed to detachably hold an electrically powered electronic appliance (3) provided with a display screen (5) and manually activatable function keys (7), characterized in that the equipment has a cavity (11) in which the appliance (3) is held and which for that purpose is open at the front where the cavity (11) is bordered by a part (13a) made of soft material connected to a plate (15) mounted so that it can rotate about an axis (15a) that is transverse to the back of the cavity (11), the appliance (3) being pressed up behind and/or against this part made of soft material (13a) under the effect of first and second thrusting means (17, 19) which for that purpose respectively comprise:

a rear pusher (17a) mounted in the back (11a) of the cavity (11) and provided with first return means (17b) designed to push the appliance (3) forwards with enough force to allow it to be operated by pressing its keys (7) when these keys (7) face toward the user, and lateral pushers (19*a*, 19*b*) mounted on the lateral edge (11*b*) of the cavity (11), behind the part (11*a*) made of soft material and provided with second return means (19*c*) designed to push the appliance (3) toward the opposite side.

2. The assembly as claimed in claim 1, characterized in that the plate is, with said part made of soft material (13*a*, 13*b*), mounted so that it can rotate with respect to a cup-shaped part (33) situated behind it and in which it is engaged, this rotary plate (15) comprising, connected together:

a façade ring (37) in the central opening (37*a*) of which said part made of soft material (13*a*, 13*b*) is detachably mounted, and an intermediate cup (39) which bounds said cavity (11), the back (11*a*) of which holds the rear pusher (17*a*) and the lateral edge (11*b*) of which holds the lateral pushers (19*a*, 19*b*).

3. The assembly as claimed in claim 1, characterized in that at least one of the lateral pushers (19*a*, 19*b*) is in the form of a jaw with lateral raised edges (190, 191) directed toward the cavity (11) and between which an edge (3*a*) of the electronic appliance is held.

4. The assembly as claimed in claim 1, characterized in that the appliance (3) held is one of the following: a mobile telephone, a personal organizer, a satellite navigation display unit and, preferably, the display screen (5) and the keys (7) of this appliance (3) are accessible and able to function on the façade, both when the appliance (3) is active and when it is on standby.

5. The assembly as claimed in claim 1, characterized in that the part made of soft material (13*a*) is interchangeable and corresponds to one out of at least two collars (13*a*, 13*b*), the central opening (130*a*) of one of which is greater than that (130*b*) of the other, to hold two types of electronic appliance (3, 30) of different sizes and which is mounted detachably on the plate (15), which is at least essentially made of a harder material.

6. The assembly as claimed in claim 5, characterized in that, when positioned in the cavity (11), the appliance (3) is connected detachably to a first connector (23*a*) of an electric lead (23) comprising a second connector (23*b*) connected detachably to a fixed outlet (25) of the vehicle which outlet is connected to the electrical power supply circuit (27) of this vehicle.

7. The assembly as claimed in claim 1, characterized in that, when positioned in the cavity (11), the appliance (3) is connected detachably to a first connector (23*a*) of an electric lead (23) comprising a second connector (23*b*) connected detachably to a fixed outlet (25) of the vehicle which outlet is connected to the electrical power supply circuit (27) of this vehicle.

8. The assembly as claimed in claim 7, characterized in that the equipment belongs to a compartment door (29) mounted in an articulated manner on a near-vertical part of the façade of the vehicle instrument panel (1), the compartment door, as it pivots, closing and opening a storage binnacle (31) in one wall (31*a*) of which said fixed power outlet (25) is situated.

9. The assembly as claimed in claim 7, characterized in that the electric lead (23) passes through the rear pusher (17*a*), along said transverse axis (15*a*), and is wound at the rear of a cup-shaped part (33) situated behind the rotary plate (15).

10. The assembly as claimed in claim 7, characterized in that the appliance (3) held is one of the following: a mobile telephone, a personal organizer, a satellite navigation display unit and, preferably, the display screen (5) and the keys (7) of this appliance (3) are accessible and able to function on the façade, both when the appliance (3) is active and when it is on standby.

11. The assembly as claimed in claim 10, characterized in that the electric lead (23) passes through the rear pusher (17*a*), along said transverse axis (15*a*), and is wound at the rear of a cup-shaped part (33) situated behind the rotary plate (15).

12. The assembly as claimed in claim 10, characterized in that the equipment belongs to a compartment door (29) mounted in an articulated manner on a near-vertical part of the façade of the vehicle instrument panel (1), the compartment door, as it pivots, closing and opening a storage binnacle (31) in one wall (31*a*) of which said fixed power outlet (25) is situated.

13. The assembly as claimed in claim 12, characterized in that the electric lead (23) passes through the rear pusher (17*a*), along said transverse axis (15*a*), and is wound at the rear of a cup-shaped part (33) situated behind the rotary plate (15).

* * * * *